(12) United States Patent
Klesyk et al.

(10) Patent No.: US 10,797,492 B2
(45) Date of Patent: Oct. 6, 2020

(54) AC INVERTER PRE-CHARGE CURRENT LIMITING SYSTEM

(71) Applicant: Lear Corporation, Southfield, MI (US)

(72) Inventors: Krzysztof Klesyk, Novi, MI (US); Raef Aidibi, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 344 days.

(21) Appl. No.: 15/968,057

(22) Filed: May 1, 2018

(65) Prior Publication Data
US 2019/0341790 A1    Nov. 7, 2019

(51) Int. Cl.
*H02J 7/00* (2006.01)
*H02J 7/20* (2006.01)

(52) U.S. Cl.
CPC .............. *H02J 7/0029* (2013.01); *H02J 7/20* (2013.01); *H02J 7/00304* (2020.01); *H02J 2007/0067* (2013.01)

(58) Field of Classification Search
CPC .. H02J 7/0029; H02J 2207/20; H02J 7/00304; H02J 2007/0067; H02J 7/04; H02J 7/022; H02J 2310/48; H02M 2001/0029; H02M 7/53871; H02M 1/36; H02M 1/32; B60L 53/20; B60L 2240/529; B60L 2210/42
See application file for complete search history.

(56) References Cited

U.S. PATENT DOCUMENTS

| | | | |
|---|---|---|---|
| 6,278,622 B1* | 8/2001 | Shimazaki | H02J 3/38 363/36 |
| 2009/0295224 A1 | 12/2009 | Kobayashi et al. | |
| 2011/0082611 A1* | 4/2011 | Shiba | B60W 30/182 701/22 |
| 2013/0099787 A1* | 4/2013 | Lu | H02M 3/3376 324/319 |
| 2013/0234508 A1 | 9/2013 | Eisele et al. | |
| 2015/0326010 A1 | 11/2015 | Keil | |
| 2015/0357838 A1 | 12/2015 | Federle | |

(Continued)

FOREIGN PATENT DOCUMENTS

DE    102011086495 A1    5/2013

*Primary Examiner* — Jared Fureman
*Assistant Examiner* — Emmanuel Dominique
(74) *Attorney, Agent, or Firm* — Brooks Kushman P.C.

(57) ABSTRACT

In one embodiment, a vehicle pre-charge limiting system is disclosed. The system includes an inverter, a comparator, a latch circuit, and a microprocessor. The inverter inverts a first power signal into a second power signal. The comparator receives a first measured current of the second power signal and compares the first measured current to a predetermined current value. The comparator transmits a first control signal indicative of the first measured current exceeding the predetermined current value. The latch circuit transmits a second control signal to the inverter to discontinue inverting the first power signal and transmits a first latch signal. The microprocessor receives a first sense signal indicative of current of the first power signal and transmits a third control signal to the latch circuit. The microprocessor inverts the first power signal into the second power signal for a predetermined number of output periods.

20 Claims, 2 Drawing Sheets

(56) References Cited

U.S. PATENT DOCUMENTS

| | | |
|---|---|---|
| 2016/0229298 A1 | 8/2016 | Chen et al. |
| 2017/0313198 A1* | 11/2017 | Yamada ................. H02P 6/16 |
| 2017/0317620 A1* | 11/2017 | Yamamoto .......... H02M 7/5395 |
| 2018/0091061 A1* | 3/2018 | Sakakibara ............. H02M 1/08 |

* cited by examiner

AC INVERTER PRE-CHARGE CURRENT LIMITING SYSTEM

TECHNICAL FIELD

Aspects disclosed herein generally relate to an alternating current (AC) pre-charge limiting system. These aspects and others will be discussed in more detail herein.

BACKGROUND

U.S. Publication No. 20150357838 to Federle discloses a battery system, having at least one battery cell, wherein a circuit arrangement is provided in a negative current path. The circuit arrangement includes two series-connected field-effect transistors, of which the battery-cell-side field-effect transistor has a charge-current-blocking diode path and can be bridged by a precharging path with a precharging resistor, and the field-effect transistor which is remote from the battery cell has a discharge-current-blocking diode path. The system also includes a voltmeter for detecting a voltage present across the field-effect transistor directly upstream and downstream of the field-effect transistor which is remote from the battery cell; and a current sensor for detecting a current flowing through the negative current path.

SUMMARY

In one embodiment, a vehicle pre-charge limiting system is disclosed. The system includes an inverter, a comparator, a latch circuit, and a microprocessor. The inverter is configured to invert a first power signal into a second power signal based on an input voltage. The comparator is configured to receive a first measured current of the second power signal and to compare the first measured current to a predetermined current value. The comparator is configured to transmit a first control signal indicative of the first measured current exceeding the predetermined current value. The latch circuit is configured to transmit a second control signal to the inverter to discontinue inverting the first power signal in response to the first control signal and to transmit a first latch signal indicative of the inverter discontinuing the inversion of the first power signal. The microprocessor is configured to receive a first sense signal indicative of current of the first power signal and to transmit a third control signal to the latch circuit to enable the inverter to invert the first power signal into the second power signal. The microprocessor is further configured to invert the first power signal into the second power signal for a predetermined number of output periods in response to the first latch signal and to establish the predetermined number of output periods based on the first sense signal.

In another embodiment, a method for providing vehicle pre-charge limiting is provided. The method includes inverting, via an inverter, a first power signal into a second power signal based on an input voltage and receiving a first measured current of the second power signal. The method further includes comparing the first measured current to a predetermined current value and generating a first control signal indicative of the first measured current exceeding the predetermined current value. The method further includes transmitting a second control signal from a latch circuit to the inverter to discontinue inverting the first power signal in response to the first control signal and transmitting a first latch signal indicative of the inverter discontinuing the inversion of the first power signal. The method further includes receiving, at a microprocessor, a first sense signal indicative of current of the first power signal and transmitting a third control signal from the microprocessor to the latch circuit to enable the inverter to invert the first power signal into the second power signal for a predetermined number of output periods in response to the first latch signal. The method further includes establishing the predetermined number of output periods based on the first sense signal.

In another embodiment, a vehicle pre-charge limiting system is disclosed. The system includes an inverter, a comparator, a latch circuit, and a microprocessor. The inverter is configured to invert a rectified DC input into an AC signal based on an input voltage. The comparator is configured to receive a first measured current of the AC signal and to compare the first measured current to a predetermined current value. The comparator is further configured to transmit a first control signal indicative of the first measured current exceeding the predetermined current value. The latch circuit is configured to transmit a second control signal to the inverter to discontinue inverting the rectified DC input in response to the first control signal and to transmit a first latch signal indicative of the inverter discontinuing the inversion of the rectified DC input. The microprocessor is configured to receive a first sense signal indicative of current of the rectified DC input and to transmit a third control signal to the latch circuit to enable the inverter to invert the rectified DC input into the AC signal for a predetermined number of output periods in response to the first latch signal. The microprocessor is further configured to establish the predetermined number of output periods based on the first sense signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for receiving and transmitting data, respectively from and to other hardware based devices as discussed herein.

Figure 1:
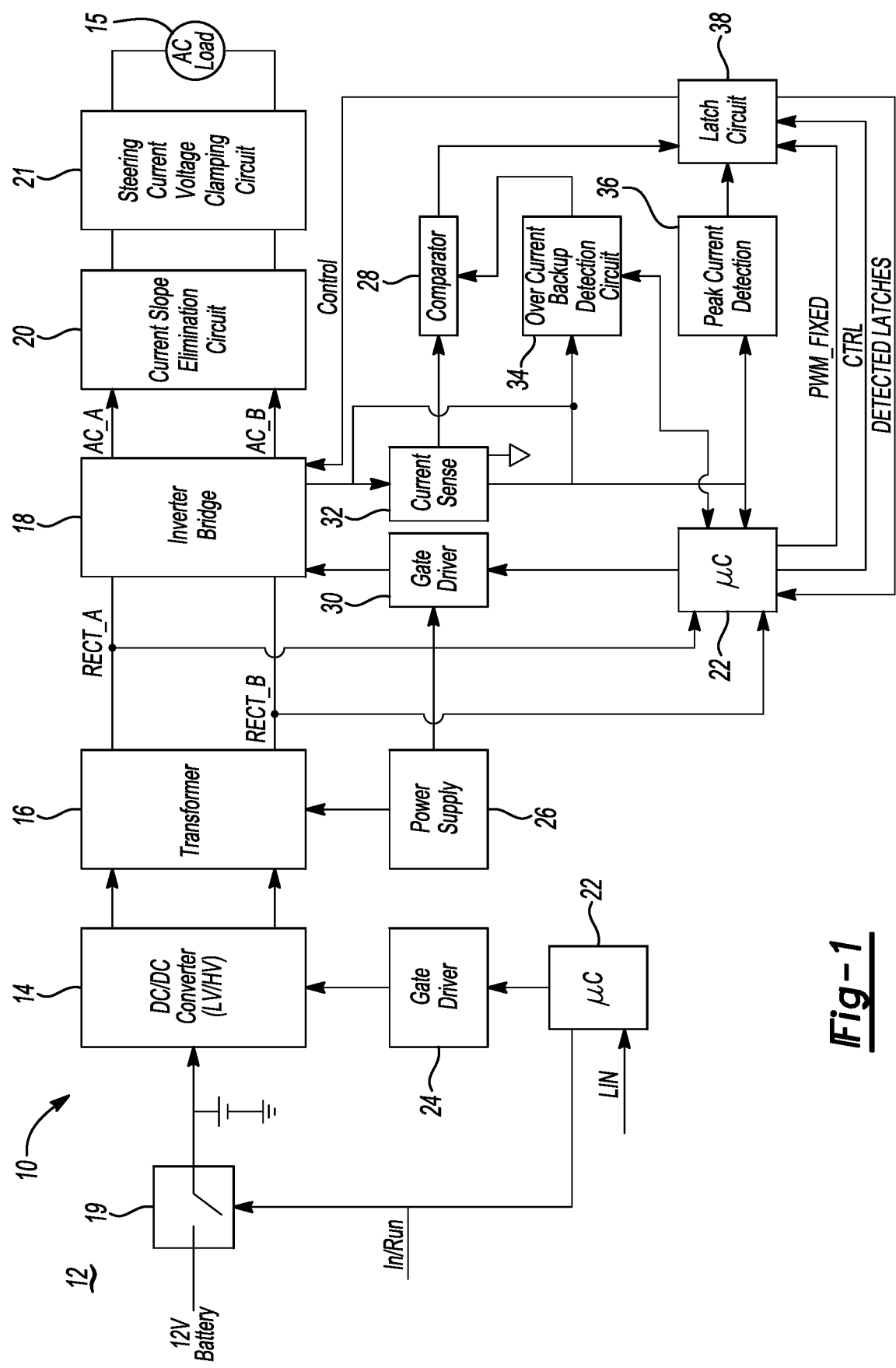
FIG. 1 generally depicts a pre-charge current limiting system in accordance to one embodiment.

FIG. 1 depicts a pre-charge current limiting system 10 positioned in a vehicle 12 in accordance to one embodiment. In one example, the system 10 may comprise one or more discrete sections that are partitioned into different electronic devices. In another example, the system 10 may be integrated into a single device or apparatus. In general, the system 10 is configured to convert a low voltage direct current (DC) input (e.g., 12V) (or input voltage) from one or more vehicle batteries (not shown) into an alternating current to provide the same to an alternating current (AC) load 15. The system 10 generally includes a DC/DC converter 14, a transformer 16, an inverter bridge 18 (or inverter), a current slope elimination circuit 20, a microprocessor 22, and a current steering voltage clamping circuit 21. An optional relay (or switch) 19 is electrically connected to the one or more vehicle batteries and the DC/DC converter 14. Upon the ignition being placed in the "RUN" position, the relay 19 closes to provide a low voltage to the DC/DC converter 14 for the one or more vehicle batteries. The DC/DC converter 14 converts the low voltage into a high voltage and provides the same to the transformer 16. The DC/DC converter 14 generally includes a plurality of switching devices (e.g., MOSFETs) (not shown) for converting the low voltage into the high voltage. A gate driver 24 is electrically coupled to DC/DC converter 14. The microprocessor 22 digitally controls the gate driver 24 to pulse width modulate, with a particular switching frequency, the plurality of switching devices of the DC/DC converter 14 to convert the low voltage into the high voltage.

The transformer 16 generates a rectified DC output (or a raw AC output) in response to the high voltage from the DC/DC converter 14. The rectified DC output includes a stepped up current. The inverter bridge 18 also includes a plurality of switching devices (e.g., MOSFETS). The inverter bridge 18 converts the rectified DC output into an AC output on signals A_AC and B_AC. The AC output on the signal A_AC may have a different phase than the AC output on the signal B_AC. For example, the AC output on the signal A_AC may be positive when the AC output on the signal A_AC is negative and vice versa. The AC output may be a simulated AC output that is generated by the switching operation of the plurality of switching devices. A gate driver 30 is electrically coupled to inverter bridge 18. The microprocessor 22 digitally controls the gate driver 30 to pulse width modulate, with a particular switching frequency, the plurality of switching devices of the inverter bridge 18 to invert the rectified DC output into the AC output.

The current slope elimination circuit 20 generally includes a first inductor (not shown) for receiving the signal A_AC and a second inductor (not shown) for receiving the signal B_AC. The first inductor and the second inductor of the current slope elimination circuit 20 are configured to slow down a current rise time (or lower the current slew rate) of the AC output on the signals A_AC and B_AC. The current steering voltage clamping circuit 21 includes at least one diode (or at least one steering diode not shown) to clamp (or regulate) the AC output voltage. For example, the voltage clamping circuit 21 provides negative and positive output clamping of the AC output to provide protection for the plurality of switching devices of the inverter bridge 18 and for the gate driver 30. The voltage clamping circuit 21 enables the use of only a single current sense circuit 32 and control circuit.

The steering diodes of the voltage clamping circuit 21 ensures that the voltage input to the first inductor and the second inductor of the current slope elimination circuit 20 does not exceed the HV output provided by the DC/DC converter 14 and does not fall below a HV ground. If the voltage for the first and second inductors exceed the HV output, then such a condition may cause a fast-high side transition which causes excessive current across the steering diodes of the voltage clamping circuit 21. This condition damages the steering diodes which further results in insufficient gate voltage for the plurality of switching devices of the inverter bridge 18. The steering diodes of the current steering clamping circuit 21 also force current to flow through the current sense circuit 22. For example, when a high side switch turns off in the inverter bridge 18, a corresponding low side switch in the DC/DC converter 14 turns on. As a result, on load-side of the steering diodes of the current clamping circuit 21, the first and second diodes force current back into the ground which in turn ensures that a first side of a low side switch has a positive current. As such, a positive waveform can be detected on the current sense circuit 32 (i.e., flowing through a first part of a bridge).

The system 10 further includes a power supply 26, a comparator 28, a current sense circuit 32, an overcurrent backup detection circuit 34, a peak current detection circuit 36, and a latch circuit 38. The current sense circuit 32 measures the current of the inverter bridge 18 and provides a current measurement output indicative of the same to the microprocessor 22, the comparator 28, the overcurrent backup detection circuit 34, and the peak current detection circuit 36. The current sense circuit 32 measures the current of the AC output. The comparator 28 compares the current measurement output to a predetermined current value (e.g., approximately 15 A or other suitable value). If the comparator 28 determines that the value of the current measurement output exceeds the predetermined current value, then the comparator 28 trips the latch circuit 38. The latch circuit 38 provides an output to the inverter bridge 18 to prevent the inverter bridge 18 from generating the AC output. The latch circuit 38 provides the output to the inverter bridge 18 to prevent the inverter bridge 18 from generating the AC output until the latch circuit 38 is reset by a next fixed PWM signal from the microprocessor 22. In general, the latch circuit 38 may be a flip-flop circuit and retain its current value until an input is provided to reset the latch circuit 38 (or the change the value of the latch circuit 38).

In one example, the microprocessor 22 outputs the fixed PWM signal at, for example, 30 kHz to the latch circuit 38 to reset the latch circuit 38. The latch circuit 38 then allows the inverter bridge 18 to generate the AC output in response to the fixed PWM signal or the next PWM cycle from the microprocessor 22. This condition may allow for the inverter bridge 18 to generate a predetermined number of AC output periods when the fixed PWM signal is provided to the latch circuit 38 for a full period. The full period may correspond to 50 or 60 Hz. The microprocessor 22 measures a bulk voltage on the rectified DC output as provided by the transformer 16. In the event the bulk voltage on the rectified DC output is 100V from the transformer 16, the fixed PWM signal (as output by the microprocessor 22) enables the latch circuit 38 to generate, for example, 12 AC output periods which generally corresponds to an output AC duty cycle of 49%. Thus, in this case, 12 AC output periods corresponds to approximately 100 ms. In the event the bulk voltage on the rectified DC output is 160V from the transformer 16, the fixed PWM signal (as output by the microprocessor 22) enables the latch circuit 38 to generate, for example, 26 AC output periods. In general, assuming that the bulk voltage is 160V with a duty cycle of 25% (i.e., to obtain the same RMS AC voltage), then the system 10 allows for 24 cycles. The bulk voltage generally corresponds to a raw AC voltage.

The microprocessor 22 monitors the number of times the latch circuit 38 latches the inverter bridge 18 to prevent the inverter bridge 18 from generating the AC output. For example, the latch circuit 38 provides a signal to the microprocessor 22 that indicates the number of times that the latch circuit 38 latches the inverter bridge 18 to prevent the inverter bridge 18 from generating the AC output. In the event the current measurement output of the inverter bridge 18 exceeds the predetermined current value for a predetermined number of AC output periods (e.g., 12 or 26 AC output periods as noted above which depends on the measured bulk voltage on the rectified DC output), then the microprocessor 22 increments a first count. In general, the first count corresponds to the microprocessor 22 detecting a preliminary overcurrent condition with respect to the inverter bridge 18. If the current measurement output of the inverter bridge 18 does not exceed the predetermined current value, then the first count is not incremented. In the event the first count reaches a first predetermined count (e.g., 10) (this, in essence, indicates that the current measurement of the inverter bridge 18 has exceeded the predetermined current value 120 times ((e.g., 12 AC output periods*10 counts if the bulk voltage of the rectified DC output is 100V) or 260 times (e.g., 26 AC output periods*10 counts if the bulk voltage of the rectified DC output is 160V)) and this condition corresponds to a provisional (or temporary) overcurrent current condition with respect to the inverter bridge 18, then the microcontroller 22 increments a second count for every occurrence that the first count reaches the first predetermined count within a predetermined period of time (e.g., 133 μs). In the event the second count is increased consecutively and reaches a second predetermined count (e.g., 22), then the microprocessor 22 determines that an overcurrent condition has occurred (e.g., a true overcurrent current condition has occurred) and moves into an overcurrent protection mode and disables the inverter bridge 18 altogether to provide overcurrent protection for the system 10. In the event the second count was not consecutively increased to reach the second predetermined count, then the microprocessor 22 enables the inverter bridge 18 to provide the AC output and system 10 functionality resumes.

In general, the second predetermined count may correspond to the following equation:

$$\text{Second predetermined count} = (BLK \text{ voltage}/5) - 10 \qquad (\text{Eq. 1}).$$

In this case, assume for purposes of explanation that the bulk voltage is 160V (which may be a typical value), then the second predetermined count=(160V/5)−10=22. Thus, the second predetermined count is based on the bulk voltage on the rectified DC output as provided by the transformer 16.

The overcurrent backup detection circuit 34 may generally serve as a backup sensor to the current sense circuit 32 to monitor the current output from the inverter bridge 18 in the event the current sense circuit 32 is inoperable. The peak current detection circuit 36 may monitor current from either the current slope elimination circuit 20 and/or the current steering voltage clamping circuit 21 and to provide an output indicative of the same to the microprocessor 22 in the event a peak current condition is detected.

Figure 2:
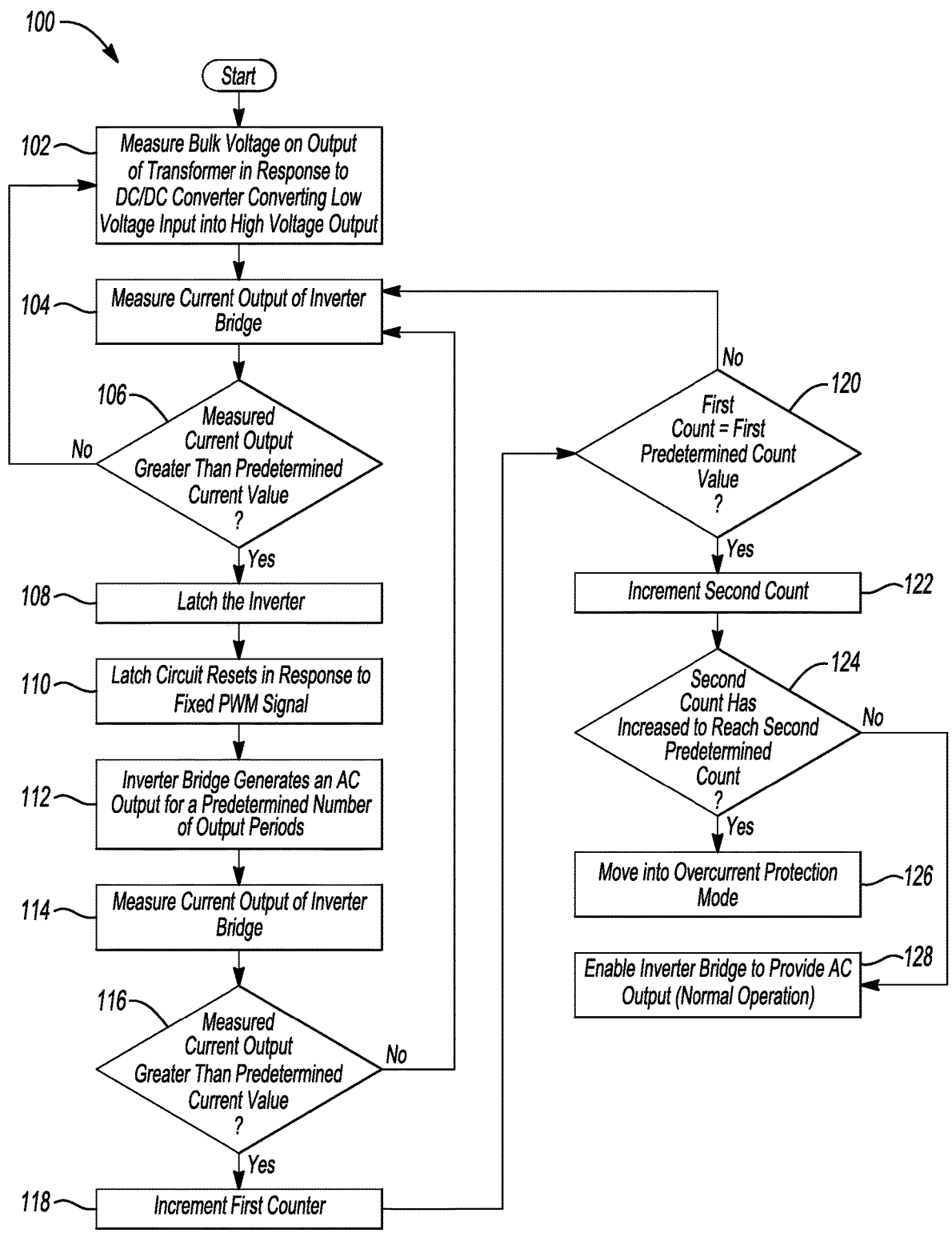
FIG. 2 generally depicts a method for performing pre-charge current limiting in a vehicle in accordance to one embodiment.

FIG. 2 generally depicts a method 100 for performing pre-charge current limiting in the vehicle 12.

In operation 102, the microprocessor 22 measures the bulk voltage on the rectified DC output as provided by the transformer 16.

In operation 104, the current sense circuit 32 measures the current of the AC output from the inverter bridge 18 and provides a current measurement output to the comparator 28.

In operation 106, the comparator 28 compares the current measurement output to a predetermined current value (e.g., approximately 15 A or other suitable value). If the current measurement output is greater than the predetermined current value, then the method 100 moves to operation 108. If not, the method 100 moves back to operation 102.

In operation 108, the latch circuit 38 provides an output to the inverter bridge 18 to prevent the inverter bridge 18 from generating the AC output.

In operation 110, the latch circuit 38 is reset in response to receiving the fixed PWM signal from the microprocessor 22 at a switching frequency of, for example, 30 kHz. The latch circuit 38 transmits the output to the inverter bridge 18 to enable the inverter bridge 18 to resume generating the AC output.

In operation 112, the latch circuit 38 enables the inverter bridge 18 to generate the AC output based for a predetermined number of AC output periods when the fixed PWM signal is provided to the latch circuit 38 for a full period. The switching frequency of the fixed PWM signal from the microprocessor 22 is based on the measured bulk voltage on the output from the transformer 16. In general, the measured bulk voltage is generally indicative of the AC output periods which corresponds to a limit for determining whether the current measurement of the inverter bridge 18 exceeds the predetermined current value. In other words, the bulk voltage may be used to determine if an overcurrent condition has occurred.

In operation 114, the current sense circuit 32 measures the current of the AC output from the inverter bridge 18 after the inverter bridge 18 generates the AC output for the predetermined number of AC output periods.

In operation 116, the comparator 28 compares the current measurement output to the predetermined current value. If the current measurement output is greater than the predetermined current value, then the method 100 moves to operation 118. If not, the method 100 moves back to operation 104.

In operation 118, the microprocessor 22 increments a first count in response to the current measurement output exceeding the predetermined current value after the inverter bridge 18 generates the AC output for the predetermined number of AC output periods. This condition corresponds to the inverter bridge 18 exhibiting a temporary overcurrent condition.

In operation 120, the microprocessor 22 determines whether the first count is equal to the first predetermined count value (e.g., 10) within a predetermined period of time (e.g., 133 μs). If this condition is true, then the method 100 moves to operation 122. If this condition is false, then the method 100 moves back to operation 108 where operations 104, 106, 108, 110, 112, 114, 116, or 118 are executed again.

In operation 122, the microprocessor 22 increments a second count in response to the first count being equal to the first determined count value with the predetermined period of time.

In operation 124, the microprocessor 22 monitors whether the second count has increased consecutively and reaches the second predetermined count (e.g., 10). For example, in the event the first count reaches a first predetermined count (see operation 120) (this corresponds to the current measurement of the inverter bridge 18 exceeding the predetermined current value 120 times ((e.g., 12 AC output periods*10 counts if the bulk voltage of the rectified DC output is 100V) or 260 times (e.g., 26 AC output periods*10 counts if the bulk voltage of the rectified DC output is 160V)), then the microcontroller 22 increments a second count (see operation 122) for every occurrence that the first count reaches the first predetermined count within a predetermined period of time (e.g., 133 µs).

In operation 126, the microprocessor 22 determines that an overcurrent condition has occurred and moves into an overcurrent protection mode and disables the inverter bridge 18 altogether.

In operation 128, in the event the second count was not consecutively increased to reach the second predetermined count, then the microprocessor 22 enables the inverter bridge 18 to provide the AC output and system 10 functionality resumes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle pre-charge limiting system comprising:
   an inverter being configured to invert a first power signal into a second power signal based on an input voltage;
   a comparator configured to:
      receive a first measured current of the second power signal;
      compare the first measured current to a predetermined current value; and
      transmit a first control signal indicative of the first measured current exceeding the predetermined current value;
   a latch circuit configured to:
      transmit a second control signal to the inverter to discontinue inverting the first power signal in response to the first control signal; and
      transmit a first latch signal indicative of the inverter discontinuing the inversion of the first power signal; and
   a microprocessor configured to:
      receive a first sense signal indicative of current of the first power signal;
      transmit a third control signal to the latch circuit to enable the inverter to invert the first power signal into the second power signal for a predetermined number of output periods in response to the first latch signal; and
      establish the predetermined number of output periods based on the first sense signal.

2. The vehicle pre-charge limiting system of claim 1 further comprising a transformer configured to generate the first power signal in response to the second power signal, wherein the first power signal corresponds to a rectified direct current (DC) voltage.

3. The vehicle pre-charge limiting system of claim 2 further comprising a DC/DC converter configured to generate the second power signal in response to the input voltage.

4. The vehicle pre-charge limiting system of claim 1, wherein the microprocessor is further configured to increment a first count in response to the first latch signal and to compare the first count to a first predetermined count value.

5. The vehicle pre-charge limiting system of claim 4, wherein the inverter is configured to invert the first power signal into the second power signal in the event the first count is not equal to the first predetermined count value.

6. The vehicle pre-charge limiting system of claim 4, wherein the microprocessor is further configured to increment a second count in the event the first count is equal to the first predetermined count value.

7. The vehicle pre-charge limiting system of claim 6, wherein the microprocessor is further configured to compare the second count to a second predetermined count value.

8. The vehicle pre-charge limiting system of claim 7, wherein the microprocessor is further configured to disable the inverter from inverting the first power signal into the second power signal to move into an overcurrent protection mode in the event the second count is equal to the second predetermined count value.

9. The vehicle pre-charge limiting system of claim 7, wherein the inverter is configured to invert the first power signal into the second power signal in the event the second count is not equal to the first predetermined count value.

10. The vehicle pre-charge limiting system of claim 1, wherein the microprocessor is further configured to transmit a third control signal as a fixed pulse width modulated (PWM) signal to the latch circuit for a predetermined number of AC output periods to enable the inverter to invert the first power signal.

11. The vehicle pre-charge limiting system of claim 1, wherein the latch circuit is a flip flop circuit.

12. A method for providing vehicle pre-charge limiting, the method comprising:
   inverting, via an inverter, a first power signal into a second power signal based on an input voltage;
   receiving a first measured current of the second power signal;
   comparing the first measured current to a predetermined current value;
   generating a first control signal indicative of the first measured current exceeding the predetermined current value;
   transmitting a second control signal from a latch circuit to the inverter to discontinue inverting the first power signal in response to the first control signal;
   transmitting a first latch signal indicative of the inverter discontinuing the inversion of the first power signal;
   receiving, at a microprocessor, a first sense signal indicative of current of the first power signal;
   transmitting a third control signal from the microprocessor to the latch circuit to enable the inverter to invert the first power signal into the second power signal for a predetermined number of output periods in response to the first latch signal; and
   establishing the predetermined number of output periods based on the first sense signal.

13. The method of claim 12 further comprising:
incrementing a first count in response to the first latch signal; and
comparing the first count to a first predetermined count value.

14. The method of claim 13 further comprising inverting the first power signal into the second power signal in the event the first count is not equal to the first predetermined count value.

15. The method of claim 13 further comprising incrementing a second count in the event the first count is equal to the first predetermined count value.

16. The method of claim 15 further comprising comparing the second count to a second predetermined count value.

17. The method of claim 16 further comprising:
disabling the inverter from inverting the first power signal into the second power signal in the event the second count is equal to the second predetermined count value; and
moving into an overcurrent protection mode in the event the second count is equal to the second predetermined count value.

18. The method of claim 16 further comprising inverting the first power signal into the second power signal in the event the second count is not equal to the first predetermined count value.

19. The method of claim 12 further comprising generating the first power signal with a transformer in response to a second power signal, wherein the first power signal corresponds to a rectified direct current (DC) voltage.

20. A vehicle pre-charge limiting system comprising:
an inverter being configured to invert a rectified DC input into an AC signal based on an input voltage;
a comparator configured to:
receive a first measured current of the AC signal;
compare the first measured current to a predetermined current value; and
transmit a first control signal indicative of the first measured current exceeding the predetermined current value;
a latch circuit configured to:
transmit a second control signal to the inverter to discontinue inverting the rectified DC input in response to the first control signal; and
transmit a first latch signal indicative of the inverter discontinuing the inversion of the rectified DC input; and
a microprocessor configured to:
receive a first sense signal indicative of current of the rectified DC input;
transmit a third control signal to the latch circuit to enable the inverter to invert the rectified DC input into the AC signal for a predetermined number of output periods in response to the first latch signal; and
establish the predetermined number of output periods based on the first sense signal.

\* \* \* \* \*